United States Patent
Kuan et al.

(10) Patent No.: US 7,836,166 B2
(45) Date of Patent: Nov. 16, 2010

(54) DETERMINING THE SERVICE SET IDENTIFICATION OF AN ACCESS POINT IN A WIRELESS LOCAL AREA NETWORK

(75) Inventors: Chia-Chee Kuan, Los Altos, CA (US); Miles Wu, Fremont, CA (US); Dean Au, Sunnyvale, CA (US)

(73) Assignee: Airmagnet, Inc., Sunnyvale, CA (US)

( * ) Notice: Subject to any disclaimer, the term of this patent is extended or adjusted under 35 U.S.C. 154(b) by 733 days.

(21) Appl. No.: 10/880,222

(22) Filed: Jun. 28, 2004

(65) Prior Publication Data

US 2004/0236851 A1    Nov. 25, 2004

Related U.S. Application Data

(63) Continuation of application No. 10/410,668, filed on Apr. 8, 2003.

(60) Provisional application No. 60/371,084, filed on Apr. 8, 2002.

(51) Int. Cl.
*G06F 15/173* (2006.01)

(52) U.S. Cl. .................. 709/224; 709/223; 370/252; 370/270; 370/329; 370/338; 714/39; 445/446

(58) Field of Classification Search ......... 709/223–224, 709/225; 370/338, 329, 252, 270; 455/432, 455/446

See application file for complete search history.

(56) References Cited

U.S. PATENT DOCUMENTS

| | | | |
|---|---|---|---|
| 5,661,727 A | 8/1997 | Kermani et al. | |
| 5,889,772 A * | 3/1999 | Fischer et al. | 370/346 |
| 6,031,833 A | 2/2000 | Fickes et al. | |
| 6,473,413 B1 * | 10/2002 | Chiou et al. | 370/331 |
| 6,553,336 B1 | 4/2003 | Johnson et al. | |
| 6,625,115 B1 | 9/2003 | Ikeda et al. | |

(Continued)

FOREIGN PATENT DOCUMENTS

CN    1247657    3/2000

(Continued)

OTHER PUBLICATIONS

Bardwell, J. "Assessing Wireless Security with AiroPeek" Internet Citation online, Jan. 13, 2002, XP002406414 retrieved Nov. 9, 2006 from the Internet: http://www.packetnexus.com/docs/AiroPeek_Security.pdf 6 pages.

(Continued)

*Primary Examiner*—Thu Ha T Nguyen
(74) *Attorney, Agent, or Firm*—Blakely, Sokoloff, Taylor & Zafman LLP

(57) ABSTRACT

The service set identification (SSID) of an access point (AP) in a wireless local area network (WLAN), where the AP suppresses its SSID in beacon frames broadcasted by the AP, is determined. At a detector located in the WLAN, a probe request broadcasted by a station through the WLAN is received. At the detector, a probe response sent by the AP to the station through the WLAN in response to the probe request broadcasted by the station is received. At the detector, the SSID of the AP is obtained from the received probe response.

18 Claims, 6 Drawing Sheets

U.S. PATENT DOCUMENTS

| | | | |
|---|---|---|---|
| 6,646,604 | B2 | 11/2003 | Anderson |
| 6,657,981 | B1* | 12/2003 | Lee et al. .................... 370/331 |
| 6,674,738 | B1 | 1/2004 | Yildiz et al. |
| 6,842,460 | B1* | 1/2005 | Olkkonen et al. ........... 370/465 |
| 7,149,521 | B2* | 12/2006 | Sundar et al. ............ 455/435.1 |
| 7,167,713 | B2 | 1/2007 | Anderson |
| 7,271,765 | B2 | 9/2007 | Stilp et al. |
| 2002/0077787 | A1 | 6/2002 | Rappaport |
| 2002/0085516 | A1* | 7/2002 | Bridgelall ................... 370/329 |
| 2003/0037033 | A1* | 2/2003 | Nyman et al. .................. 707/1 |
| 2003/0081583 | A1* | 5/2003 | Kowalski .................... 370/338 |
| 2003/0117986 | A1 | 6/2003 | Thermond et al. |
| 2003/0134636 | A1* | 7/2003 | Sundar et al. ............... 455/432 |
| 2003/0134638 | A1 | 7/2003 | Sundar et al. |
| 2003/0135762 | A1 | 7/2003 | Macaulay |
| 2003/0149891 | A1 | 8/2003 | Thomsen |
| 2003/0221006 | A1 | 11/2003 | Kuan et al. |
| 2004/0039817 | A1* | 2/2004 | Lee et al. .................... 709/225 |
| 2004/0066759 | A1* | 4/2004 | Molteni et al. .............. 370/329 |
| 2004/0073933 | A1 | 4/2004 | Gollnick et al. |
| 2004/0110530 | A1 | 6/2004 | Alone et al. |
| 2004/0252837 | A1 | 12/2004 | Harvey et al. |
| 2005/0030929 | A1 | 2/2005 | Swier et al. |
| 2005/0058112 | A1 | 3/2005 | Lahey et al. |
| 2005/0147073 | A1 | 7/2005 | Hietalahti et al. |
| 2005/0250440 | A1 | 11/2005 | Zhou et al. |
| 2006/0078123 | A1 | 4/2006 | Bichot et al. |
| 2006/0280140 | A9 | 12/2006 | Mahany et al. |
| 2008/0013487 | A1* | 1/2008 | Molteni et al. .............. 370/329 |

FOREIGN PATENT DOCUMENTS

| | | |
|---|---|---|
| EP | 0695058 A2 | 1/1996 |
| JP | 8-237334 | 9/1996 |
| JP | 9-130339 | 5/1997 |
| JP | 2001-86074 | 3/2001 |
| JP | 2001-512635 | 8/2001 |
| WO | WO 98/36532 | 8/1998 |
| WO | WO 02/17572 | 2/2002 |

OTHER PUBLICATIONS

Graham, R. Sniffing (network wiretap, sniffer) FAQ, online Internet Citation, Apr. 15, 2000, XP002357967, retrieved 2006 from the internet: http://www.robertgraham.com/pubs/sniffing-faq.html 45 pages.

IBM Research, "IBM Research Demonstrates Industry's First Auditing Tool for Wireless Network Security", online internet citation, Jul. 12, 2001, XP002263357, retrieved Nov. 28, 2003 from the Internet http://www.research.ibm.com/resources/news/20010712_wireless.shtml 1 page.

Sheu, Shiann-Tsong, et al.,"Dynamic Access Point Approach (DAPA) for IEEE 802.11 Wireless LANs", Vehicular Technology Conference, Fall 1999. IEEE VTS 50$^{th}$ Amsterdam, Netherlands, Sept. 19-22, 1999, Piscataway, NJ USA vol. 5, Sep. 19, 1999, XP010353384. ISBN 07803-5435-4 pp. 2646-2650.

International Preliminary Examination Report mailed on Jan. 2, 2004 for PCT/US03/10727 filed Apr. 8, 2003.

International Search Report mailed on Nov. 13, 2003 for PCT/US03/10727 filed on Apr. 8, 2003.

* cited by examiner

DETERMINING THE SERVICE SET IDENTIFICATION OF AN ACCESS POINT IN A WIRELESS LOCAL AREA NETWORK

CROSS REFERENCE TO RELATED APPLICATIONS

This application is a continuation of application Ser. No. 10/410,668, filed Apr. 8, 2003, the entire content of which is incorporated herein by reference, which claims the benefit of an earlier filed provisional application U.S. Provisional Application Ser. No. 60/371,084, entitled MONITORING A LOCAL AREA NETWORK, filed on Apr. 8, 2002, the entire content of which is incorporated herein by reference.

BACKGROUND

1. Field of the Invention

The present invention generally relates to wireless local area networks. More particularly, the present invention relates to monitoring a wireless local area network.

2. Description of the Related Art

Computers have traditionally communicated with each other through wired local area networks ("LANs"). However, with the increased demand for mobile computers such as laptops, personal digital assistants, and the like, wireless local area networks ("WLANs") have developed as a way for computers to communicate with each other through transmissions over a wireless medium using radio signals, infrared signals, and the like.

In order to promote interoperability of WLANs with each other and with wired LANs, the IEEE 802.11 standard was developed as an international standard for WLANs. Generally, the IEEE 802.11 standard was designed to present users with the same interface as an IEEE 802 wired LAN, while allowing data to be transported over a wireless medium.

In accordance with the IEEE 802.11 standard, a station is authenticated and associated with an access point in the WLAN before obtaining service from the access point. The access point broadcasts beacon frames, which can include the service set identification (SSID) of the access point. However, in some instances, the AP is configured to suppress its SSID in the beacon frames, which prevents someone from determining the SSID of the AP from the beacon frames.

SUMMARY

In one exemplary embodiment, the service set identification (SSID) of an access point (AP) in a wireless local area network (WLAN), where the AP suppresses its SSID in beacon frames broadcasted by the AP, is determined. At a detector located in the WLAN, a probe request broadcasted by a station through the WLAN is received. At the detector, a probe response sent by the AP to the station through the WLAN in response to the probe request broadcasted by the station is received. At the detector, the SSID of the AP is obtained from the received probe response.

DESCRIPTION OF THE DRAWING FIGURES

The present invention can be best understood by reference to the following detailed description taken in conjunction with the accompanying drawing figures, in which like parts may be referred to by like numerals:

DETAILED DESCRIPTION

In order to provide a more thorough understanding of the present invention, the following description sets forth numerous specific details, such as specific configurations, parameters, examples, and the like. It should be recognized, however, that such description is not intended as a limitation on the scope of the present invention, but is intended to provide a better description of the exemplary embodiments.

Figure 1:
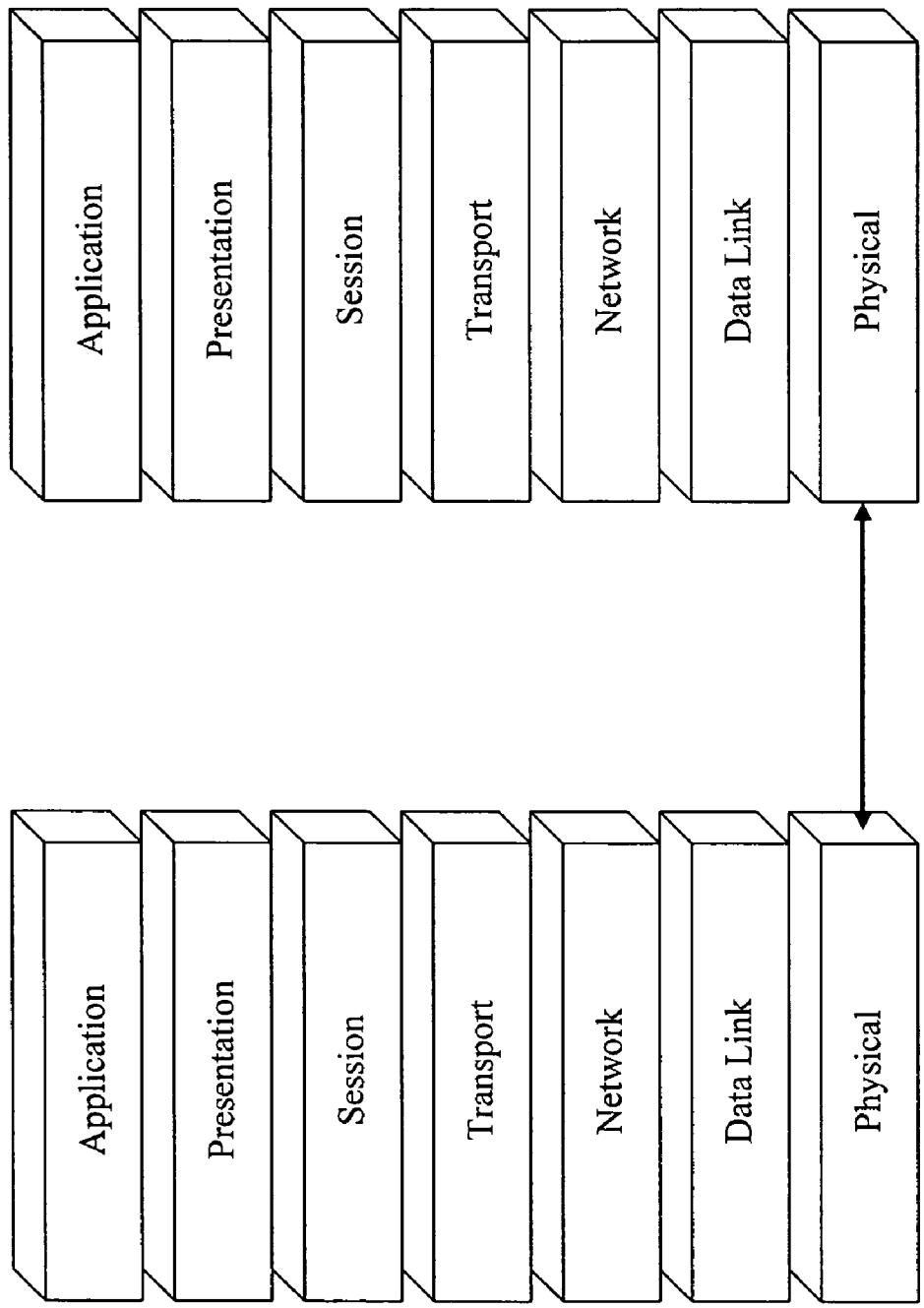
FIG. 1 shows an exemplary Open Systems Interconnection (OSI) seven layer model.

With reference to FIG. 1, an exemplary Open Systems Interconnection (OSI) seven layer model is shown, which represents an abstract model of a networking system divided into layers according to their respective functionalities. In particular, the seven layers include a physical layer corresponding to layer 1, a data link layer corresponding to layer 2, a network layer corresponding to layer 3, a transport layer corresponding to layer 4, a session layer corresponding to layer 5, a presentation layer corresponding to layer 6, and an application layer corresponding to layer 7. Each layer in the OSI model only interacts directly with the layer immediately above or below it.

As depicted in FIG. 1, different computers can communicate directly with each other only at the physical layer. However, different computers can effectively communicate at the same layer using common protocols. For example, one computer can communicate with another computer at the application layer by propagating a frame from the application layer through each layer below it until the frame reaches the physical layer. The frame can then be transmitted to the physical layer of another computer and propagated through each layer above the physical layer until the frame reaches the application layer of that computer.

The IEEE 802.11 standard for wireless local area networks ("WLANs") operates at the data link layer, which corresponds to layer 2 of the OSI seven layer model, as described above. Because IEEE 802.11 operates at layer 2 of the OSI seven layer model, layers 3 and above can operate according to the same protocols used with IEEE 802 wired LANs. Furthermore, layers 3 and above can be unaware of the network actually transporting data at layers 2 and below. Accordingly, layers 3 and above can operate identically in the IEEE 802 wired LAN and the IEEE 802.11 WLAN. Furthermore, users can be presented with the same interface, regardless of whether a wired LAN or WLAN is used.

Figure 2:
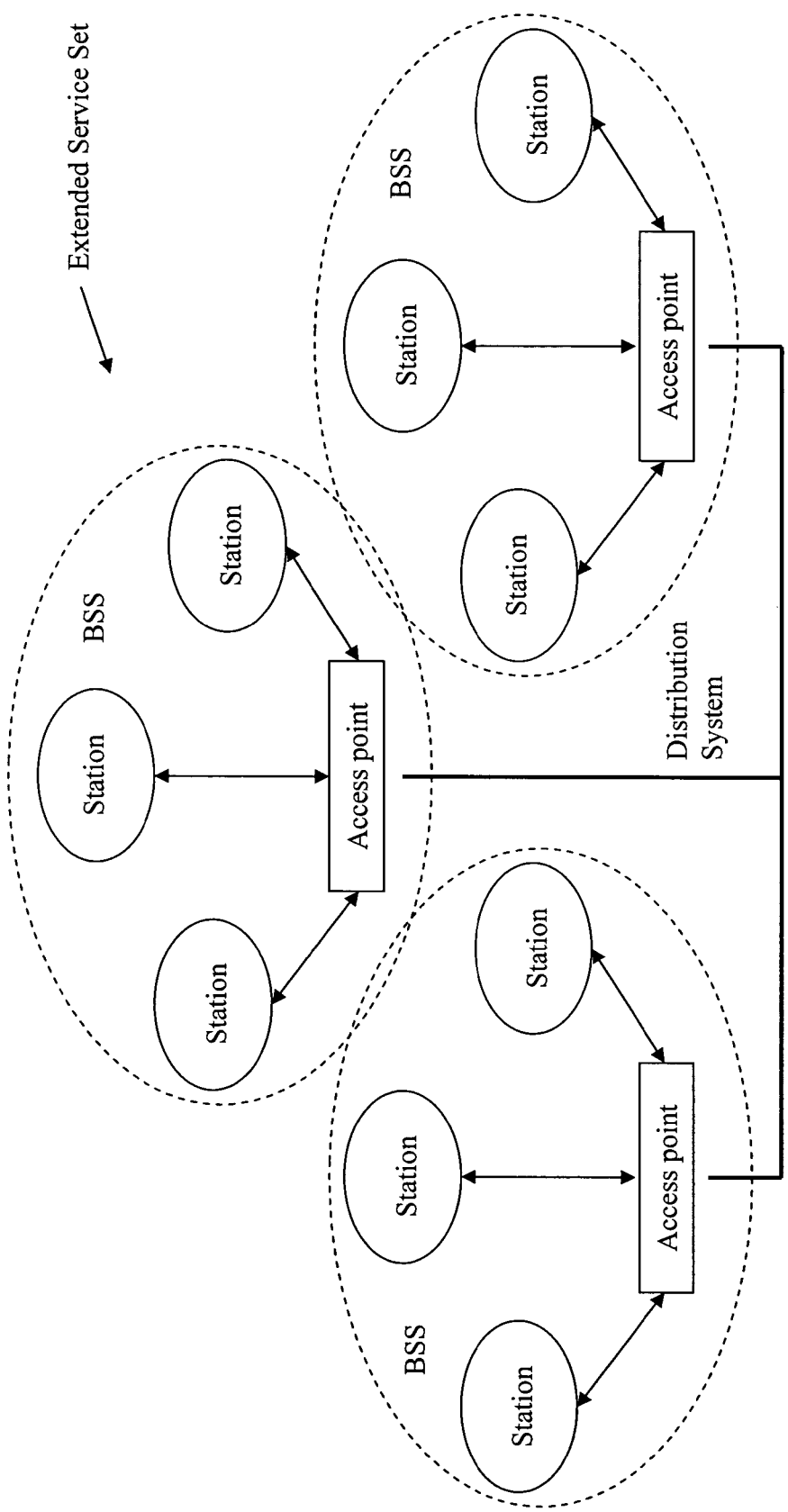
FIG. 2 shows an exemplary extended service set in a wireless local area network ("WLAN")

With reference to FIG. 2, an example of an extended service set, which forms a WLAN according to the IEEE 802.11 standard, is depicted having three basic service sets ("BSS"). Each BSS can include an access point ("AP") and one or more stations. A station is a component that can be used to connect to the WLAN, which can be mobile, portable, stationary, and the like, and can be referred to as the network adapter or network interface card. For instance, a station can be a laptop computer, a personal digital assistant, and the like. In addition, a station can support station services such as authentication, deauthentication, privacy, delivery of data, and the like.

Each station can communicate directly with an AP through an air link, such as by sending a radio or infrared signal between WLAN transmitters and receivers. Each AP can support station services, as described above, and can additionally support distribution services, such as association, disassociation, distribution, integration, and the like. Accordingly, an AP can communicate with one or more stations within its BSS, and with other APs through a medium, typically called a distribution system, which forms the backbone of the WLAN. This distribution system can include both wireless and wired connections.

Figure 3:
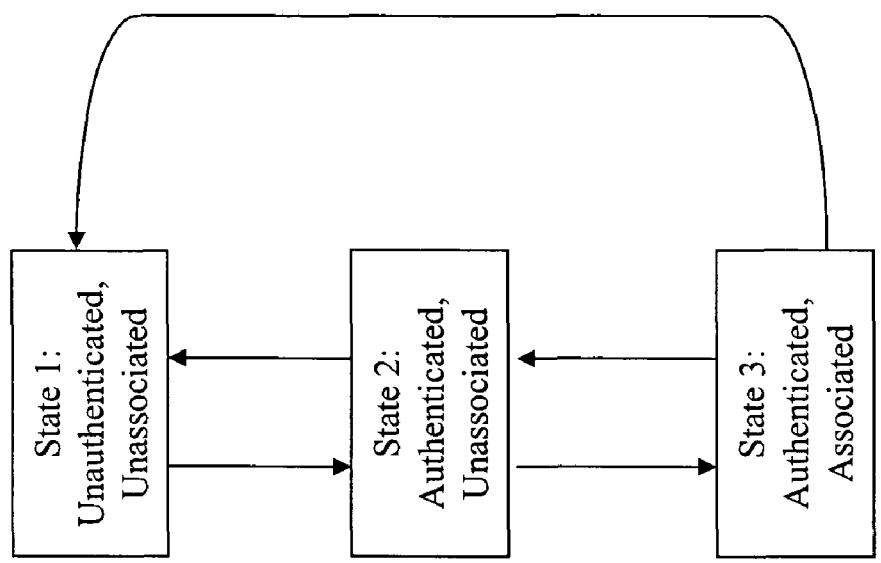
FIG. 3 is an exemplary flow diagram illustrating various states of stations in a WLAN.

With reference to FIGS. 2 and 3, under the current IEEE 802.11 standard, each station must be authenticated to and associated with an AP in order to become a part of a BSS and receive service from an AP. Accordingly, with reference to FIG. 3, a station begins in State 1, where the station is unauthenticated to and unassociated with an AP. In State 1, the station can only use a limited number of frame types, such as frame types that can allow the station to locate and authenticate to an AP, and the like.

If a station successfully authenticates to an AP, then the station can be elevated to State 2, where the station is authenticated to and unassociated with the AP. In State 2, the station can use a limited number of frame types, such as frame types that can allow the station to associate with an AP, and the like.

If a station then successfully associates or reassociates with an AP, then the station can be elevated to State 3, where the station is authenticated to and associated with the AP. In State 3, the station can use any frame types to communicate with the AP and other stations in the WLAN. If the station receives a disassociation notification, then the station can be transitioned to State 2. Furthermore, if the station then receives a deauthentication notification, then the station can be transitioned to State 1. Under the IEEE 802.11 standard, a station can be authenticated to different APs simultaneously, but can only be associated with one AP at any time.

With reference again to FIG. 2, once a station is authenticated to and associated with an AP, the station can communicate with another station in the WLAN. In particular, a station can send a message having a source address, a basic service set identification address ("BSSID"), and a destination address, to its associated AP. The AP can then distribute the message to the station specified as the destination address in the message. This destination address can specify a station in the same BSS, or in another BSS that is linked to the AP through the distribution system.

Although FIG. 2 depicts an extended service set having three BSSs, each of which include three stations, an extended service set can include any number of BSSs, which can include any number of stations.

Figure 4:
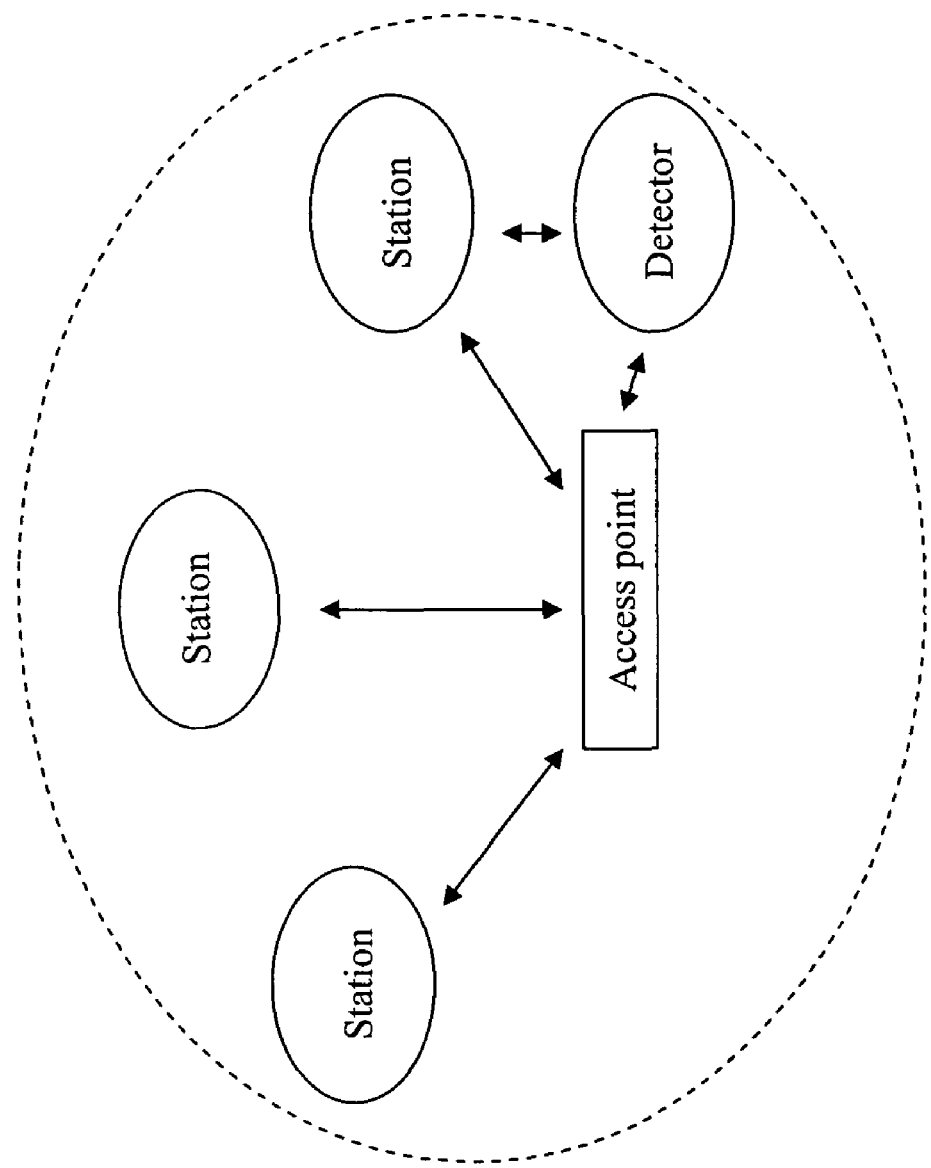
FIG. 4 shows an exemplary embodiment of an access point and a station exchanging transmissions.

With reference to FIG. 4, a detector can be used to monitor a WLAN. More specifically, the detector can be configured to receive transmissions on the WLAN, then compile a database based on the received transmissions. As will be described below, the information compiled in the database can then be used to monitor the WLAN for the occurrence of various events and/or to diagnose problems.

Figure 5:
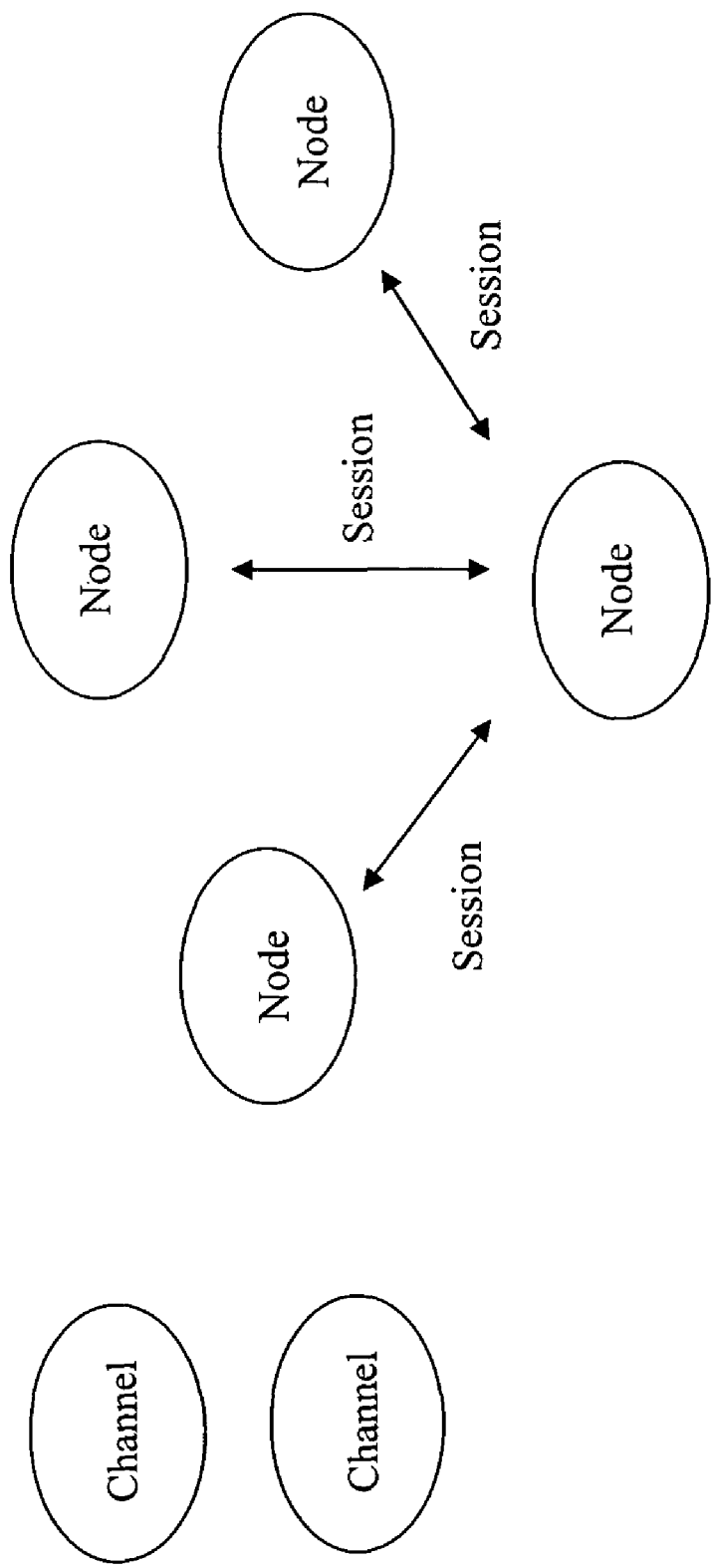
FIG. 5 shows elements of an exemplary database.

With reference to FIG. 5, in one configuration, the database compiled by the detector includes node elements, session elements, and channel elements. Note that FIG. 5 is intended to depict the structure of the database compiled by the detector in abstract and not intended to depict the actual structure of the database.

A node element is associated with a node in the WLAN, such as an AP or a station. In one configuration, node elements are indexed by MAC addresses, which can be obtained from the source and destination address fields of frames. Each node element in the database includes one set of statistics that tracks the number of transmissions into that node and another set of statistic that tracks the number of transmissions out of that node. The set of statistics categorizes transmissions according to frame types (beacon, probes, etc.), address type (unicast, multicast, broadcast, etc.), receive radio attributes (signal strength, noise, CRC error, transmission speed, et.). Each node element can also include one or more of the following fields:

createtime (time when the node is discovered)
MACaddress (MAC address of the node)
BeaconInterval (the beacon interval if the node is an AP)
Capability (bit map of ESS/IBSS, CF-poll, wired equivalent privacy (WEP), preamble, channel agility, etc.)
AuthAlgos (Open system or share key authentication)
IsInEssMODE (Infrastructure mode)
HasPrivacy (WEP enabled)
SupportShortPreamble (Short preamble supported)
IsAP (this node is an AP)
IsBridge (this node is a bridge)
ApAnnouncedSSID (If it is an AP, did it announce SSID)
SSID (SSID of the node (AP or Station))
APNAME (If node is an AP, its announced AP name)
DSParamSet (Channel assignment)
SupportedRates (1, 2, 5.5, or 11 mbps)
IPAddress (IP address of the node)

A session element is associated with a session established between any two nodes, such as when a station is authenticated and associated with an AP. Each session element in the database includes one set of statistics that tracks the number of transmissions in one direction between two nodes and another set of statistics that tracks the number of transmissions in another direction between two nodes. For example, if the session is between a station and an AP, one set of statistics tracks the number of transmissions from the station to the AP and another set of statistics tracks the number of transmissions from the AP to the station.

A channel element is associated with a channel in the WLAN. In the current implementation of the IEEE 802.11 standard, a total of 11 channels are used in the US, 13 channels are used in Europe, and 14 channels are used in Japan. Each channel element in the database includes a set of statistics that tracks the number of transmissions in that channel.

Having thus described the basic configuration of the database compiled by the detector, the following describes the different types of transmissions that can be received by the detector and the types of information that can be obtained from the transmissions:

TABLE 1

| Types of Transmissions | Obtained Information |
| --- | --- |
| Beacon Frame | Beacon Interval, Capability, Privacy Preamble, SSID, Supported Rates, Channel, AP name |
| Probe Request | SSID of sender node, Supported Rate of SSID |
| Probe Response | Beacon Interval, Capability, Privacy Preamble, SSID, Supported Rates, Channel, AP name |
| Authentication Frame | Authentication Algorithm (Open System or Shared Key), Authentication State Information (Authentication Sequence Number) |

TABLE 1-continued

| Types of Transmissions | Obtained Information |
|---|---|
| DeAuthentication Frame | Indication that the Session has been terminated |
| Association Request & ReAssociation | Sender's Capability, Supported Rates, SSID |
| Association Response | Capability, Confirm that a Session has been established |
| Data Frame | IP address, Confirm that a Session has been established, Identity of Sender, Identity of Destination, Identity of AP used |

The information obtained from the received transmissions can then be used to compile and/or update the database. For example, assume that the detector receives a beacon frame from a node that has not been added to the database. As such, a new node element is created in the database, assume that this node is labeled Node1. As described above, MAC addresses can be obtained from the source and destination address fields of frames. Additionally, a beacon frame is transmitted by an AP. As such, Node1 can be identified as an AP and by its MAC address. Additionally, as described above, a beacon frame can include information such as Beacon Interval, Capability, Privacy Preamble, SSID, Supported Rates, Channel, and AP name. As such, the appropriate fields of Node1 is updated with this information. Additionally, the set of statistics to track outbound transmissions for Node1 is updated. The set of statistics for the appropriate channel element is also updated.

Now assume that a probe request is received from a node that has not been added to the database. As such, a new node element is created in the database, assume that this node is labeled Node2. Additionally, a probe request is transmitted by a station. As such, Node2 can be identified as a station. Additionally, as described above, a probe request can include information such as SSID of the sender node and the Supported Rate of the sender node. As such, the appropriate fields of Node2 is updated with this information. Additionally, the set of statistics to track outbound transmissions for Node2 is updated. Moreover, assuming that the probe request is sent to Node1, which can also be determined from the probe request, the set of statistics to track inbound transmissions for Node1 is updated. The statistics field for the appropriate channel element is also updated.

The SSID of an AP can be suppressed in the beacon frame, meaning that the SSID cannot be obtained from the beacon frame. In such an instance, the SSID of the AP can be obtained from the probe request of a station that sends the probe request to the AP and the AP sends a probe response to the station. The AP would not have sent the probe response to the station had the probe request not contained the proper SSID. Thus, in this manner, the SSID of an AP that suppresses its SSID in its beacon can be determined based on the probe request sent by a station to the AP.

Now assume that a data frame is received from a node that has not been added to the database. As such, a new node element is created in the database, assume that this node is labeled Node3. Also assume in this instance that the data frame is being sent from Node3 to Node1. The identity of Node3 and Node1 can be obtained by examining the data frame's header information, and more particularly the destination and source addresses. As such, even if the existence of Node1 had not been known, its existence can be discerned from the data frame. The transmission of the data frame between Node3 and Node1 also establishes that the two nodes are operating on the same channel and are using the same authentication algorithm. Thus, the appropriate fields for Node3 and Node1 can be updated. The set of statistics to track outbound transmissions for Node3, the set of statistics to track inbound transmissions for Node1, and the set of statistics of the appropriate channel element is also updated.

Additionally, Node1 and Node3 can be identified as stations or APs based on the header of the data frame. More particularly, an AP is identified as a distribution system in the header of the data frame. As such, if only the destination address of the data frame from Node3 to Node1 specified a distribution system, then Node1 can be identified as an AP and Node3 can be identified as a station. However, if both the destination and source addresses specified a distribution system, then Node1 and Node3 are both APs, and more particularly APs operating as a bridge. Thus, in this manner, nodes operating as bridges in the WLAN can be identified based on a data frame received at the detector.

The receipt of the data frame also confirms that a session has been established between Node3 and Node1. As such, a session element is created in the database, assume that this session is labeled Session1. The set of statistics to track transmissions from Node3 to Node1 is then updated.

If the data frame is encrypted, then Node1 and Node3 can be identified as using wired equivalent privacy (WBP) encryption. The appropriate fields in Node1 and Node3 are then updated.

In this manner, the database of the nodes, sessions, and channels within the WLAN can be compiled by the detector. Note, however, that the above examples are not meant to be comprehensive descriptions of the process of compiling the database. Rather, the above examples are meant to be illustrative of the process.

In the present exemplary embodiment, the detector compiles the database by receiving transmissions over a period of time. In one configuration, the detector compiles the database over a period of several minutes, such as 5, 10, or more minutes. Note, however, that the period of time can vary depending on the circumstances. For example, a longer period of time, such as an hour or more, can be used for a more comprehensive assessment of the WLAN.

As described above, the detector can receive transmissions over the WLAN by scanning the available channels in the WLAN. Alternatively, specific channels can be selected to be scanned. As also described above, the number of available channels can vary depending on the country. For example, in the US a total of 11 channels are used, in Europe a total of 13 channels are used, and in Japan a total of 14 channels are used.

Although the detector scans the channels to receive transmissions, it passively receives the transmissions, meaning that it does not broadcast signals on the WLAN. An advantage of passively monitoring the WLAN is that additional bandwidth on the WLAN is not consumed.

The detector can be a station in the wireless local area network. Additionally, the detector can be mobile, portable, stationary, and the like. For instance, the detector can be a laptop computer, a personal digital assistant, and the like. In addition, the detector can be used by a user as a diagnostic tool, by an administrator as an administrative tool, and the like, to monitor the WLAN.

For example, the database compiled by the detector can be used to monitor the WLAN for the occurrence of various events. The following tables list examples of some security and performance events that can be detected based on the compiled database:

TABLE 2

I. Security Events

| Event | Detection Method |
|---|---|
| AP with WEP disabled | Examine beacon frame; examine data frames to determine if data frames are encrypted |
| Client with WEP disabled | Examine data frames to determine if data frames are encrypted |
| Flawed WEP encryption | Examine 3 sequential data frames to determine if the encryption fits a predictable pattern |
| Open System auth. used | Determine from authorization request and/or response |
| Device probing network | Examine probe request frame for SSID with length of zero and if probe request frame only has SSID field. Determine if station fails to proceed with authentication after receiving probe response. |
| Auth. failures exceeded | Count number of authentication failures. |
| AP unconfigured | Examine SSID of AP and determine if SSID is a default SSID |
| Unauthorized AP detected | Compare to a list of known and authorized AP. |
| Unauthorized client detected | Compare to a list of known and authorized clients |
| Spoofed MAC address | Examine sequence number of packages to and/or from a node |

TABLE 3

II. Performance Events

| Event | Detection Method |
|---|---|
| AP with weak signal strength | Determine based on data received from WLAN Card antenna. Signal can be considered weak if below an established threshold, such as 20% - Relative Signal Strength Indicator (RSSI) |
| CRC error rate exceeded | For each channel and node, compute rate from transmitted frames. Error rate exceeded if above an established threshold, such as 20% - CRC error frames to total frames ratio |
| Frame retry rate exceeded | For each channel and node, compute rate from transmitted frames. Retry rate exceeded if above an established threshold, such as 10% - 802.11 retry frames to total frames ratio |
| Low speed tx rate exceeded | For each channel and node, compute rate from transmitted frames. Rate exceeded if above an established threshold, such as 70% - 11 mbps data frames to total data frame ratio |
| AP association capacity full | Examine association response frame for error code #17 |
| Fragmentation rate exceeded | For each channel and node, compute rate from transmitted frames. Fragmentation rate exceeded if above an established threshold, such as 50% fragmented frames to total frames ratio |
| Bandwidth usage exceeded | For each channel and node, compute air time from transmitted frames |
| Excessive missed AP beacons | Count received beacon frames. Missed AP beacons excessive if over an established threshold, such as 50% missed beacons to expected beacons ratio |
| AP not supporting high speed | Determine from beacon frames and probe response frames |
| Channel with overloaded APs | Determine from number of nodes that are Access Points in the same channel |
| Missing performance options | Determine from compatibility fields in beacon frames and probe response frames |
| Both PCF and DCF active | Determine from compatibility fields in beacon frames and probe response frames |
| APs with mutual interference | Determine from number of nodes that are Access Points in the same channel and signals (RF) from Access Points |
| Conflicting AP configuration | Determine from fields associated with nodes identified as Access Points. For example, if multiple APs have same SSID |
| Channel with high noise level | Determine based on data received from WLAN Card antenna |
| Excessive multicast/Broadcast | For each channel and frame, determine number of multicast/broadcast frames from transmitted frames. Number excessive if more than an established threshold, such as 10% of total frames |

In one configuration, when one of the events listed above is detected, the detector can be configured to provide an alarm. Note, however, that which events trigger an alarm and the type of alarm provided can be selected and/or altered by a user.

In addition to compiling a database, determining the state of a particular station can be desirable, such as in analyzing problems that the station may be experiencing in obtaining service. As described above, according to the current IEEE 802.11 standard, a station is authenticated and associated with an AP to become a part of a BSS and thus obtain service. As also described above, the steps in the authentication and association process is categorized into 3 states (i.e., State 1, State 2, and State 3).

Figure 6:
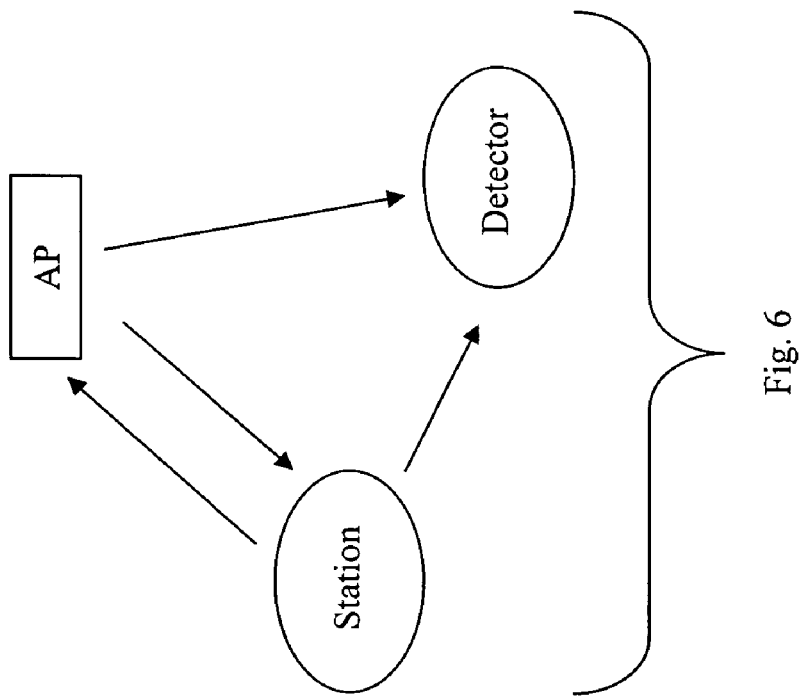
FIG. 6 shows another exemplary embodiment of an access point and a station exchanging transmissions.

For example, with reference to FIG. 6, assume that a station is having difficulty in obtaining service from an AP. Determining if the station is able to reach State 1, State 2, or State 3 can assist in trouble shooting the problem.

Thus, a detector can be located in the WLAN such that the detector can receive transmissions sent from and received by the station. Note that the detector need not necessarily be physically adjacent the station. Instead, the detector can be sufficiently near the station such that the reception range of the detector covers the station and the AP.

By examining the transmissions sent from and received by the station, the detector can determine the state of the station. More particularly, different types of transmissions can be identified as being indicative of different states. For example, in the following table are different types of transmissions and the state that they indicate:

TABLE 4

| Type of Transmission | State |
|---|---|
| Probe Request Transmitted by Station | 1 |
| Probe Response Transmitted by AP | 1 |
| Authentication Request Transmitted by Station | 1 |
| Authentication Response w/Challenge Text Transmitted by AP | 1 |
| Authentication Challenge Response Transmitted by Station | 1 |
| Authentication Final Response Transmitted by AP | 1 - on negative response<br>2 - on positive response |
| Deauthentication Transmitted by AP | 1 |
| Disassociation Transmitted by AP | 1 |
| Association Request Transmitted by Station | 2 |
| Association Response Transmitted by Station | 2 - on negative response<br>3 - on positive response |

TABLE 4-continued

| Type of Transmission | State |
|---|---|
| Higher Layer Protocol Data Transmitted by Station or AP | 3 |

Thus, when a transmission sent to or from the station is received, the detector examines the transmission to determine if the transmission is one of the types of transmissions listed above. If it is, then the detector can determine the state of the station that received or sent the transmission. Note that the detector can also determine the state of the station based on the received transmissions for the station in the compiled database.

For example, if the detector receives a probe request frame sent by the station, then the detector can determine that the station is at State 1. If the detector receives a probe response frame sent by the AP to the station, then the detector can determine that the station is at State 1. If the station receives a data frame, which is a higher layer protocol data, sent by the station or received by the station, then the detector can determine that the station is at State 3.

The detector can also be configured to display the types of transmissions as a checklist. For example, the following checklist can be displayed:

TABLE 5

Beacon received by Station
Probe request sent by Station
Probe response received by Station
Auth. request sent by Station
Auth. challenge received by Station
Auth. challenge response received by Station
Auth. final response received by Station
Assoc. request sent by Station
Assoc. response received by Station
Data sent by Station
Data received by Station When one of the transmissions on the list is detected, then that type of transmission is marked. For example, if an authorization request sent by the station is received, the detector can "check off" the "Auth. request sent" line from above. In this manner, the user of the detector, such as an administrator of the WLAN or a trouble-shooter, can more easily determine the state of the station.

Additionally, as will be explained below, a station can use one or more channels. As such, a separate checklist can be provided for each of the available channels.

Figure 7:
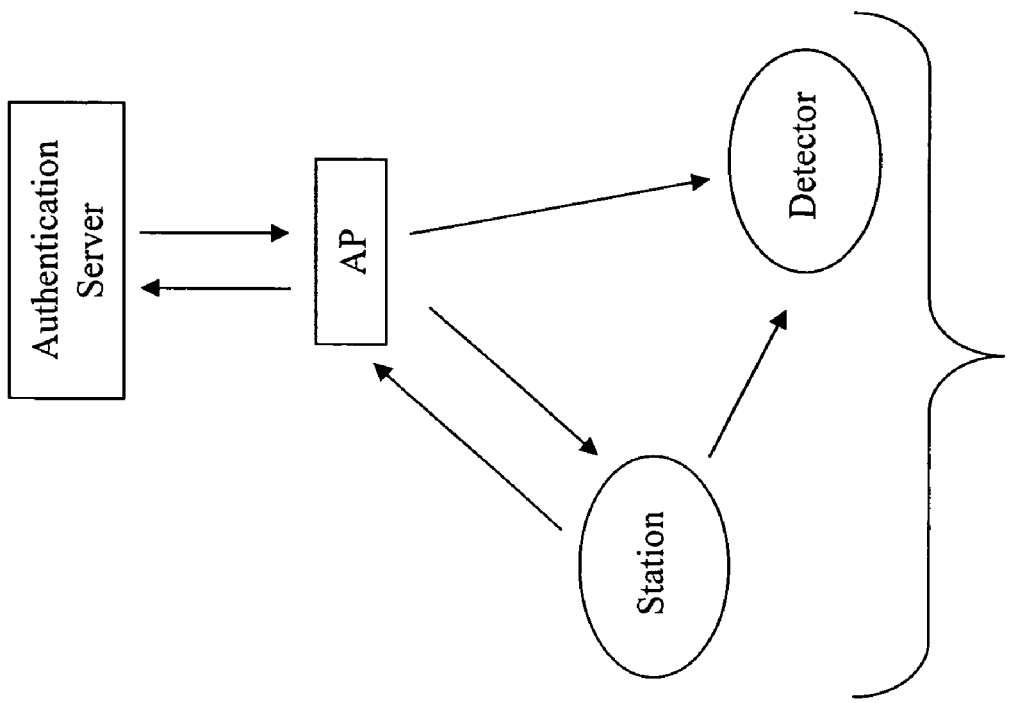
FIG. 7 shows still another exemplary embodiment of an access point and a station exchanging transmissions.

With reference to FIG. 7, as described above, before a station can receive service from an AP, the station must be authenticated. In order to increase security, an authentication protocol can be implemented in a WLAN environment, such as the extensible authentication protocol over LANs (EAPOL) protocol in accordance with the IEEE 802.1x standard.

In accordance with the current EAPOL protocol, a station wanting to be authenticated, which is referred to as a supplicant, is authenticated using an authentication server, such as a remote authentication dial in user service (RADIUS) server. As depicted in FIG. 7, the station communicates with the AP, and the AP, which is referred to as the authenticator, communicates with the authentication server to authenticate the station.

During the authentication process, the station, AP, and authentication server exchange a number of transmissions. More specifically, in one exemplary mode of operation, the AP sends an "EAP-Request/Identity" transmission to the station. The station then sends an "EAP-Response/Identity" transmission to the AP. The AP then sends the received "EAP-Response/Identity" transmission to the authentication server. In response, the authentication server sends a challenge to the AP, such as with a token password system. The AP sends the challenge to the station as a credential request. The station sends a response to the credential request to the AP. The AP sends the response to the authentication server. If the response from the station is proper, the authentication server sends an "EAP-Success" transmission to the AP, which sends the package to the station. If the response is improper, the authentication server sends an "EAP-Failure" transmission to the AP, which sends the transmission to the station. It should be recognized that the number and types of transmissions exchanged between the station, AP, and authentication server can vary depending on the implemented mode of operation.

As described above, in one exemplary embodiment, a detector can be located in the WLAN such that the detector can receive transmissions sent from and received by the station. Again, note that the detector need not necessarily be physically adjacent the station. Instead, the detector can be sufficiently near the station such that the reception range of the detector covers the station.

By examining the transmissions sent from and received by the station, the detector can determine the state of the station. More specifically, the detector can receive the transmissions exchanged between the station and the AP during the authentication process described above in accordance with the EAPOL protocol. The detector can then determine the state of the station based on the received transmissions. More particularly, because the EAPOL transactions occur in state 3 as 802.11 data, the station can be determined as being in state 3.

Additionally, the detector can also be configured to display the types of transmissions as a checklist. For example, the following checklist can be displayed:

TABLE 6

802.1X initiated sent by Station
Identity request sent by Station
Identity response received by Station
Credential request sent by Station
Credential response received by Station
802.1X authentication OK by Station
802.1X authentication failed by Station
De-authentication sent by Station
Data sent by Station
Data received by Station When one of the transmissions on the list is detected, then that type of transmission is marked. For example, if an "EAP-Request/Identity" package sent by the AP is received, the detector can "check off" the "Identity request sent" line from above. In this manner, the user of the detector, such as an administrator of the WLAN or a trouble-shooter, can more easily determine the state of the station.

Additionally, as will be explained below, a station can use one or more channels. As such, a separate checklist can be provided for each of the available channels.

To identify the transmissions sent from and received by the station, the detector obtains the MAC address of the station, which can be obtained from the source and destination address fields of the transmitted frames. The MAC address can also be obtained directly from the station. Alternatively, the MAC address of the station can be stored and retrieved from a table of MAC address assignments, which can be maintained by an administrator of the WLAN.

Additionally, if a particular AP that the station is attempting to communicate is known, the particular channel that the AP is operating on can then be monitored. If the station is attempting to communicate with multiple APs and the identity of those APs are known, then the particular channels that those APs are operating on can then be monitored.

Furthermore, the detector can scan the channels of the wireless local area network to receive transmissions sent from and received by the station with known or unknown APs. As described above, in the current implementation of the IEEE 802.11 standard, a total of 11 channels are used in the US, 13 channels are used in Europe, and 14 channels are used in Japan. For the sake of convenience, the following description will assume that the detector and the WLAN are located in the US. However, note that the detector can be configured to operate with any number of channels and in various countries.

In one configuration, the detector is configured to begin scanning by monitoring channel 1, then scan down each of the remaining 10 channels. If a station is having difficulty obtaining service, it will typically switch channels and repeat the association attempt therefore repeating the association failure scenario. A station can continuously cycle through the channels in an effort to obtain service. As such, the detector is configured to monitor a particular channel for a sufficient amount of time so that the station can complete one or more cycles. For example, the detector can be configured to monitor each channel for about 3 seconds.

If no transmissions are detected after scanning all of the channels, then the station is rebooted. As described above, a station can be configured to cycle repeatedly through the channels in an attempt to obtain service. However, a station can also be configured to only attempt one cycle and to stop after the last channel has been attempted. When the station is rebooted, it typically begins operating on channel 1. As such, by rebooting the station and monitoring on channel 1, a transmission sent to or received by the station can be detected. However, a station can take some time to reboot, typically a few seconds. As such, the detector is configured to monitor channel 1 for a longer duration than the other channels. For example, in one configuration, the detector is configured to monitor channel 1 for a period of 30 seconds.

As described above, the detector can scan the available channels in the WLAN. Alternatively, specific channels can be selected to be scanned. Although the detector scans the channels, it passively receives the transmissions, meaning that it does not broadcast signals on the WLAN. This has the advantage that additional bandwidth on the WLAN is not consumed.

The detector can be a station in the wireless local area network. Additionally, the detector can be mobile, portable, stationary, and the like. For instance, the detector can be a laptop computer, a personal digital assistant, and the like. In addition, the detector can be used by a user as a diagnostic tool, by an administrator as an administrative tool, and the like.

Based on the compiled database and/or the determined state of the station, the cause of the connectivity problem of the station can be determined. For example, the following tables lists some possible problems and a method of detecting the problem:

TABLE 7

| Problem | Detection Method |
|---|---|
| Mismatched SSID | By matching client station SSID against all SSID in the compiled database |
| Wildcard (match all) SSID | By matching client station SSID against NULL SSID. May only be a problem if there are mutiple SSIDs in the WLAN |
| Mismatched channel | By tracking traffic sent by the station in each channel, report the channel that AP of the same SSID exists but the station never transmitted any packets |
| Mismatched speed, privacy, network type, or preamble | By matching the capability attribute of the client station against ones of the AP's. If station ignores the probe request, then know that AP doesn't match stat |
| Authentication failure | By tracking authentication response packets. |
| Association failure | By tracking association response packet |
| Equipment failure | By noticing no packets transmitted at all from the station |
| AP signal to weak | By checking AP signal strength in the compiled database. The detector can be placed adjacent to the station to obtain signal strength |
| Mismatched speed | By matching station supported data rate against those of the APs |
| Mismatched WEP key | Association state reached and client station has transmitted data packets. The associated AP however sends no data packet back. |
| Higher layer protocol problem | By detecting successful data exchange between station and the AP |

Although the present invention has been described with respect to certain embodiments, examples, and applications, it will be apparent to those skilled in the art that various modifications and changes may be made without departing from the invention.

We claim:

1. A method to perform at a detector located in a wireless local area network (WLAN) to determine a service set identification (SSID) of an access point (AP) in the WLAN, wherein the AP suppresses a SSID in beacon frames broadcasted by the AP, the method comprising:
   receiving, at the detector, a beacon frame sent by the AP;
   determining from the beacon frame that the SSID of the AP has been suppressed;
   if the SSID of the AP has been suppressed and the SSID cannot be obtained from the beacon frame,
   receiving, at the detector, a probe request sent by a station through the WLAN to the AP that suppresses the SSID in the beacon frames;
   receiving, at the detector, a probe response sent by the AP to the station through the WLAN in response to the probe request sent by the station;
   determining, at the detector, the SSID of the AP from the received probe request that has been sent by the station to the AP, which sent the probe response; and
   obtaining, at the detector, the SSID of the AP from the received probe response.

2. The method of claim 1, wherein the station and AP are all in the same basic service set (BSS).

3. The method of claim 2, wherein the detector, station and AP operate in accordance with the IEEE 802.11 standard.

4. The method of claim 1, further comprising: at the detector, scanning a plurality of channels used in the WLAN to receive the probe request and the probe response.

5. The method of claim 1, further comprising: at the detector, scanning one or more specified channels to receive the probe request and the probe response.

6. The method of claim 1, further comprising:
    associating the SSID with the AP that sent the probe response.

7. A non-transitory computer-readable storage medium containing computer executable code to determine a service set identification (SSID) of an access point (AP) in a wireless local area network (WLAN), wherein the AP suppresses the SSID in beacon frames broadcasted by the AP, the computer executable code instructing a computer to operate as follows:
    receiving, at a detector, a beacon frame sent by the AP;
    determining from the beacon frame that the SSID of the AP has been suppressed;
    if the SSID of the AP has been suppressed and the SSID cannot be obtained from the beacon frame,
    receiving, at the detector, a probe request sent by a station through the WLAN to the AP that suppresses the SSID in the beacon frames;
    receiving, at the detector, a probe response sent by the AP to the station through the WLAN in response to the probe request sent by the station;
    determining, at the detector in the WLAN the SSID of the AP from the received probe request that has been sent by the station to the AP, which sent the probe response; and
    obtaining, at the detector, the SSID of the AP from the received probe response.

8. The non-transitory computer-readable storage medium of claim 7, wherein the station and AP are all in the same basic service set (BSS).

9. The non-transitory computer-readable storage medium of claim 8, wherein the detector, station and AP operate in accordance with the IEEE 802.11 standard.

10. The non-transitory computer-readable storage medium of claim 7, further comprising: at the detector, scanning a plurality of channels used in the WLAN to receive the probe request and the probe response.

11. The non-transitory computer-readable storage medium of claim 7, further comprising: at the detector, scanning one or more specified channels to receive the probe request and the probe response.

12. The non-transitory computer-readable storage medium of claim 7, further comprising: associating the SSID with the AP that sent the probe response.

13. A system to determine a service set identification (SSID) of an access point (AP) in a wireless local area network (WLAN), wherein the AP suppresses the SSID in beacon frames broadcasted by the AP, the system comprising:
    a station located in the WLAN, wherein the station sends a probe request having a SSID through the WLAN to the AP that suppresses the SSID in the beacon frames; and a detector located in the WLAN, wherein the detector is configured to: receive a beacon frame sent by the AP; determine from the beacon frame that the SSID of the AP has been suppressed; and if the SSID of the AP has been suppressed and the SSID cannot be obtained from the beacon frame receive the probe request sent by the station; receive a probe response sent by the AP to the station through the WLAN in response to the probe request sent by the station; and determine that the SSID of the AP from the received probe request that has been sent by the station is the SSID of the AP, which sent the probe response; and obtain, at the detector, the SSID of the AP from the received probe response.

14. The system of claim 13, wherein the station and AP are all in the same basic service set (BSS).

15. The system of claim 14, wherein the detector, station and AP operate in accordance with the IEEE 802.11 standard.

16. The system of claim 13, wherein the detector is configured to scan a plurality of channels used in the WLAN to receive the probe request and the probe response.

17. The system of claim 13, wherein the detector is configured to scan one or more specified channels to receive the probe request and the probe response.

18. The system of claim 13, wherein the detector is configured to associate the SSID with the AP that sent the probe response.

* * * * *